(12) United States Patent
Hum et al.

(10) Patent No.: US 8,089,217 B2
(45) Date of Patent: Jan. 3, 2012

(54) RECONFIGURABLE LED ARRAY AND USE IN LIGHTING SYSTEM

(75) Inventors: David Hum, Sunnyvale, CA (US); Steve Lester, Sunnyvale, CA (US)

(73) Assignee: Bridgelux, Inc., Livermore, CA (US)

( * ) Notice: Subject to any disclaimer, the term of this patent is extended or adjusted under 35 U.S.C. 154(b) by 0 days.

(21) Appl. No.: 13/080,353

(22) Filed: Apr. 5, 2011

(65) Prior Publication Data

US 2011/0181194 A1    Jul. 28, 2011

Related U.S. Application Data

(62) Division of application No. 12/504,994, filed on Jul. 17, 2009, now Pat. No. 7,936,135.

(51) Int. Cl.
*G05F 1/00* (2006.01)
(52) U.S. Cl. ........ 315/294; 315/216; 315/297; 315/307; 315/291; 315/312; 345/212; 362/240; 362/612; 340/815.45
(58) Field of Classification Search ............... 315/169.3, 315/216, 291, 294, 297, 307, 312, 362; 345/82, 345/211, 212; 362/240, 800, 612; 340/815.45
See application file for complete search history.

(56) References Cited

U.S. PATENT DOCUMENTS

| | | | |
|---|---|---|---|
| 5,293,375 A | 3/1994 | Moorwood et al. | |
| 6,734,639 B2 | 5/2004 | Chang et al. | |
| 6,798,152 B2 * | 9/2004 | Rooke et al. | 315/209 R |
| 7,116,294 B2 * | 10/2006 | Stopa | 345/82 |
| 7,936,135 B2 * | 5/2011 | Hum et al. | 315/307 |
| 7,973,877 B2 * | 7/2011 | Takeda et al. | 349/61 |
| 2004/0155844 A1 | 8/2004 | Stopa | |
| 2007/0257623 A1 | 11/2007 | Johnson et al. | |
| 2011/0169417 A1 * | 7/2011 | Hum et al. | 315/250 |

OTHER PUBLICATIONS

International Search Report, PCT/US2010/041145, dated Sep. 7, 2010, all pages.

* cited by examiner

*Primary Examiner* — Haiss Philogene
(74) *Attorney, Agent, or Firm* — Calvin B. Ward

(57) ABSTRACT

A light-emitting device capable of being powered by an AC power supply or an unregulated DC power supply is disclosed. The light-emitting device, in an aspect, is coupled to a controller, a light-emitting diode ("LED") array, and a power supply, wherein the power supply can be an AC power source or an unregulated DC power source. While the power supply provides electrical power, the controller generates various LED control signals in response to power fluctuation of the electrical power. The LED array allows at least a portion of LEDs to be activated in accordance with the logic states of the LED control signals.

4 Claims, 18 Drawing Sheets

RECONFIGURABLE LED ARRAY AND USE IN LIGHTING SYSTEM

CROSS REFERENCE TO RELATED APPLICATIONS

This is a divisional of application Ser. No. 12/504,994 filed on Jul. 17, 2009 now U.S. Pat. No. 7,936,135.

FIELD

The exemplary aspect(s) of the present invention relates to lighting devices. More specifically, the aspect(s) of the present invention relates to generating light by light-emitting devices using AC power supply or unregulated DC power supply.

BACKGROUND

Solid-state light-emitting devices such as light emitting diodes ("LEDs") are attractive candidates for replacing conventional light sources such as incandescent and fluorescent lamps. LEDs typically have substantially higher light conversion efficiencies than incandescent lamps, and have longer lifetimes than conventional light sources. Some types of LEDs have higher conversion efficiencies than fluorescent light sources and even higher conversion efficiencies have been demonstrated in the laboratory. For LEDs to be accepted in various lighting applications, it is important to optimize every step of the processing and achieve the highest efficiencies possible.

A problem associated with a conventional LED or an LED lighting system is power conversion from AC power to DC power because conventional LEDs use regulated DC power. LEDs typically run with constant DC current and constant DC voltage. Utility companies, on the other hand, deliver AC current and/or AC voltage. Conventional power supply such as power at electrical outlets is AC power. Currently available lighting systems in the marketplace such as incandescent light bulbs and/or halogen lights are powered by AC power.

A conventional approach for resolving DC power requirements for the LED lighting system is to provide AC-to-DC power conversion. Power conversion from AC to unregulated DC, and then converting from unregulated DC to regulated DC is often bulky and expensive. Specifically, capacitive elements used in AC-to-DC converters typically have shorter lifetime, which will affect overall lifetime of the LED lighting system.

SUMMARY

A light-emitting device using a reconfigurable light-emitting diode ("LED") array capable of being powered by an AC power supply or an unregulated DC power supply is disclosed. The light-emitting device, in an aspect, is coupled to a controller, an LED array, and a power supply, wherein the power supply can be an AC power source or an unregulated DC power source. While the power supply provides electrical power, the controller generates various LED control signals in response to fluctuation of the electrical power. The LED array allows at least a portion of LEDs to be activated in accordance with the logic states of the LED control signals.

It is understood that other aspects of the present invention will become readily apparent to those skilled in the art from the following detailed description, wherein it is shown and described only exemplary configurations of an LED by way of illustration. As will be realized, the present invention includes other and different aspects and its several details are able to be modified in various other respects, all without departing from the spirit and scope of the present invention. Accordingly, the drawings and the detailed description are to be regarded as illustrative in nature and not as restrictive.

BRIEF DESCRIPTION OF THE DRAWINGS

The exemplary aspect(s) of the present invention will be understood more fully from the detailed description given below and from the accompanying drawings of various aspects of the invention, which, however, should not be taken to limit the invention to the specific aspects, but are for explanation and understanding only.

DETAILED DESCRIPTION

Figure 1:
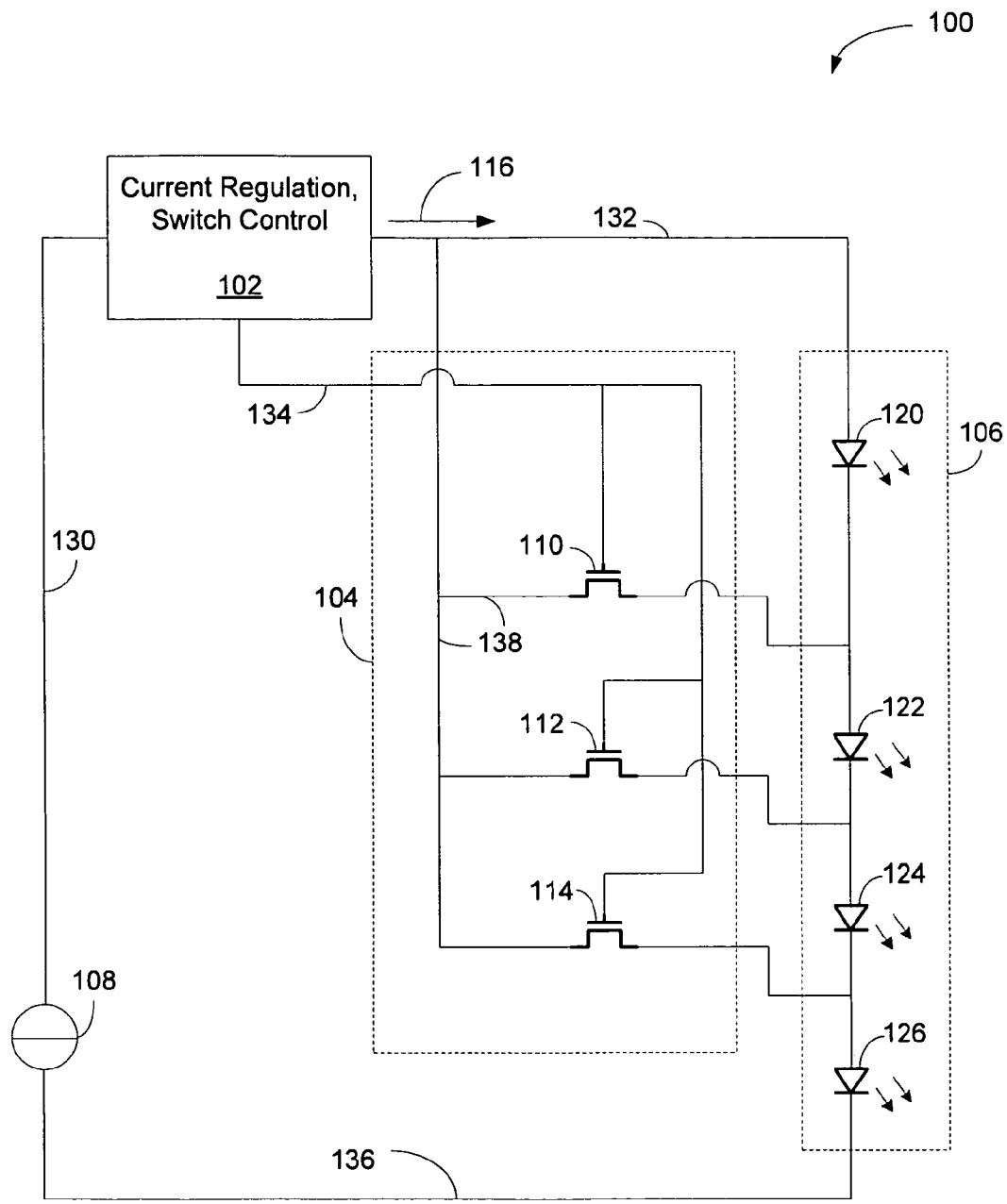
FIG. 1 is a block diagram illustrating a reconfigurable LED array having a controller capable of controlling LEDs in accordance with an aspect of the present invention.

Aspects of the present invention are described herein in the context of a method, device, and apparatus of reconfiguring light emitting diode ("LED") array capable of using AC power.

The present invention is described more fully hereinafter with reference to the accompanying drawings, in which various aspects of the present invention are shown. This invention, however, may be embodied in many different forms and should not be construed as limited to the various aspects of the present invention presented throughout this disclosure.

Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the drawings. By way of example, if an apparatus in the drawings is turned over, elements described as being on the "lower" side of other elements would then be oriented on the "upper" side of the other elements. The term "lower", can therefore, encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items Various aspects of an LED luminaire will be presented. However, as those skilled in the art will readily appreciate, these aspects may be extended to aspects of LED luminaries without departing from the invention. The LED luminaire may be configured as a direct replacement for conventional luminaries, including, by way of example, recessed lights, surface-mounted lights, pendant lights, sconces, cove lights, track lighting, under-cabinet lights, landscape or outdoor lights, flood lights, search lights, street lights, strobe lights, bay lights, strip lights, industrial lights, emergency lights, balanced arm lamps, accent lights, background lights, and other light fixtures.

As used herein, the term "light fixture" shall mean the outer shell or housing of a luminaire. The term "luminaire" shall mean a light fixture complete with a light source and other components (e.g., a fan for cooling the light source, a reflector for directing the light, etc.), if required. The term "LED luminaire" shall mean a luminaire with a light source comprising one or more LEDs. LEDs are well known in the art, and therefore, will only briefly be discussed to provide a complete description of the invention.

It is further understood that the aspect of the present invention may contain integrated circuits that are readily manufacturable using conventional semiconductor technologies, such as CMOS ("complementary metal-oxide semiconductor") technology, or other semiconductor manufacturing processes. In addition, the aspect of the present invention may be implemented with other manufacturing processes for making optical as well as electrical devices. Reference will now be made in detail to implementations of the exemplary aspect(s) as illustrated in the accompanying drawings. The same reference indicators will be used throughout the drawings and the following detailed description to refer to the same or like parts.

A light-emitting device, in an aspect, is coupled to a controller, an LED array, and a power supply, wherein the power supply can be an alternating current ("AC") power source or an unregulated direct current ("DC") power source. While the power supply provides electrical power, the controller generates various LED control signals in response to fluctuation of the electrical power. The LED array allows at least a portion of LEDs to be activated in accordance with the logic states of the LED control signals. Reconfiguration of LEDs within an LED array allows the LED system to draw power directly from unregulated DC and/or AC power sources.

FIG. 1 is a block diagram illustrating a lighting system 100 having a controller capable of controlling LEDs in accordance with an aspect of the present invention. Lighting system 100 includes a controller 102, an LED reconfiguration device 104, an LED array 106, and a power supply 108. Power supply 108, in an aspect, is an AC, rectified AC, and/or unregulated DC power source. It should be noted that the underlying concept of the exemplary aspect(s) of the present invention would not change if one or more elements (or devices) were added to or removed from system 100.

LED array 106 includes four (4) LEDs 120-126 coupled in a series and capable of generating light. One or more LEDs 120-124 can be turned on and/or off depending on logic values (or logic states) of LED control signals. For example, a current 116 traveling from controller 102 to LED array 106 via bus 132, LEDs 120-126 are lit if switches in LED reconfiguration device 104 are turned off. Depending on the applications, additional LEDs may be added or removed from LED array 106. In an alternative aspect, LEDs in LED array 106 can be organized in parallel or in a combination of series and parallel configurations.

LED reconfiguration device 104 is a switching device capable of switching on or off individual LEDs within LED array 106 in accordance with logic states of LED control signals. Device 104, in an aspect, includes three (3) switches 110-114 wherein each switch is controlled by an LED control signal. LED control signals are generated by controller 102. LED control signals control switches 110-114 through the control terminals of switches 110-114 via switch control bus 134. As indicated in FIG. 1, switches 110-114 are used to control LEDs 120-124, respectively. For example, if switch 110, which may include one or more transistors, is activated, switch 110 redirects current 116 from bus 132 to bus 138. When power traveling from bus 132 to bus 138 bypassing LED 120, LED 122 will be activated while LED 120 will be inactivated. As such, LED 120 can be effectively turned on or off depending on the logic status or logic state of LED control signal for switch 110. It should be noted that LED reconfiguration device 104 and LED array 106 can be combined into a single device.

Controller 102 is a control circuit capable of performing various signal management functions such as current regulation, switching management, power management, power monitoring, and so forth. Controller 102, in an aspect, receives power from power supply 108 via bus 130 wherein the power can be AC power, unregulated DC power, or regulated DC power. After receipt of power from bus 130, the power is forwarded to LED array 106 via bus 132 and/or bus 138. Power or electrical power is electrical energy providing electrical current and/or electrical potential differences. Upon detecting the electrical power, controller 102 generates LED control signals in accordance with electrical potential fluctuations. In an aspect, controller 102 selectively activates additional LEDs in LED array 106 when the electrical potential level increases. Similarly, controller 102 selectively deactivates one or more LEDs when the electrical potential level decreases. It should be noted that the AC power delivers electrical power as a sine wave which the electrical potential level fluctuates over time.

During an operation, controller 102 allows one (1), two (2), three (3), or four (4) LEDs to be turned on independently or at the same time based on fluctuation of the AC power. Note that the concept of having four (4) LEDs in an LED array can be extendable to either more individual LEDs or each LED includes multiple sub-LEDs in series, parallel or series-parallel combinations. Referring back to FIG. 1, LED 126, which is the last LED in the series, is always on as long as current 116 is flowing through bus 132 to bus 136.

An advantage of using the reconfigurable LED array illustrated in diagram 100 is to allow an LED lighting fixture to directly draw AC power or unregulated DC power to generate light more efficiently and for a larger fraction of the time without the requirements of having a conventional AC-to-DC converter. To provide an LED that can work with unregulated DC or AC power, a controller of the reconfigurable LED array turns multiple LEDs on and off depending on the applied voltage.

Figure 2:
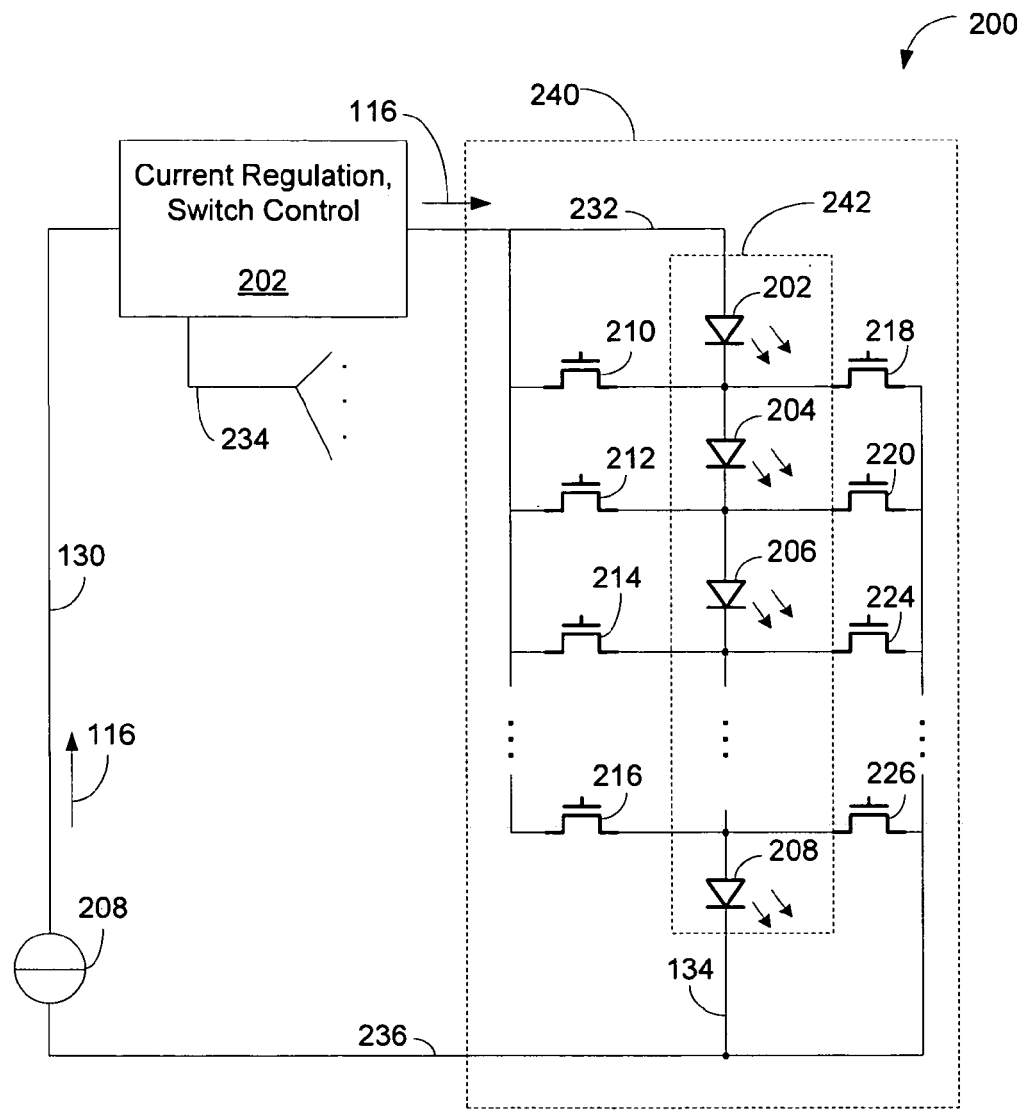
FIG. 2 is a block diagram illustrating a lighting system having a reconfigurable LED array with a controller in accordance with an aspect of the present invention.

FIG. 2 is a block diagram illustrating a lighting system 200 having a reconfigurable LED array with a controller in accordance with an aspect of the present invention. Lighting system 200 includes a controller 202, a lighting component 240, and a power supply 208. Note that power supply 208 can be a similar device as power supply 108 as described in FIG. 1. It should be noted that the underlying concept of the exemplary aspect(s) of the present invention would not change if one or more elements (or layers) were added to or removed from system 200.

Power supply 208, in an aspect, is an AC power provided by a utility company via conventional power transmission lines. Alternatively, power supply 208 is an unregulated DC power provided by a power generator. Power supply 208 supplies a power such as electrical current 116 for the circuit. The power can be interpreted as voltage, potential difference, current, or a combination of current and voltage. The term "power," "electrical power," "current," "electrical current," "voltage," and "potential difference" are used interchangeably hereinafter. When power 116 reaches controller 202, it is subsequently forwarded to lighting device 240 via bus 232.

Controller 202, capable of performing similar functions as controller 102 described in FIG. 1, monitors the fluctuation of power 116 and updates LED control signals in response to the fluctuation of power 116. Fluctuation of power or power fluctuation, for example, is power rise and fall as if in waves or sine waves carried by bus 130. Upon detecting the power fluctuation, LED control signals are adjusted in accordance with power fluctuations. For example, controller 202 turns on more LEDs when the power level is rising while it turns off one or more LEDs when the power level is falling. Note that the AC power delivers electrical power as a sine wave which fluctuates over time.

LED control signals control switches through their control terminals via bus 234 wherein switches control status of every LED in lighting component 240. The control terminal for each switch, for example, is the gate-terminal of a transistor. To simplify diagram 200, switch control bus 234 carrying LED control signals is not illustrated. Controller 202 is capable of individually accessing and/or controlling each LED whereby the on-time or activating period for LEDs can be more evenly distributed.

Lighting component 240, in an aspect, includes an LED array 242 and an array of switches 210-226, wherein switches are used to control on or off status of each LED in LED array 242. LED array 242 includes multiple LEDs 202-208 wherein LEDs 202-208 are connected in a series. Each LED within LED array 242 is controlled by a pair of switches. For example, LED 202 is controlled by switches 210 and 218. Since switches are managed by LED control signals, LEDs 202-208 can be turned on and/or off depending on logic values of LED control signals. When switches 210 and 218 are turned on (or active), LED 202, for example, will be turned off because the voltage difference across LED 202 drops to zero. Alternatively, when switches 210 and 220 are turned on and switches 218 and 212 are turned off, current 116 flows from switch 210 to LED 204, and then to switch 220 whereby LED 204 is activated and/or lit.

Depending on the applications, additional LEDs may be added to or removed from LED array 242. LEDs 202-208, for instance, can be organized in parallel or in a combination of series and parallel configurations. Lighting component 240, which can be a similar device as LED reconfigurable device 104 illustrated in FIG. 1, includes a set of switching devices and LEDs for reconfiguring LEDs in accordance with the power fluctuations. During an operation, controller 202 allows one (1), two (2), three (3), four (4), or the like to be turned on or off independently from each other based on the fluctuation of the AC power.

An advantage of employing the reconfiguration device described in diagram 200 when compared to diagram 100 is to improve reliability by more evenly distributing the time that any particular LED is on or active. Alternatively, a similar topology using fewer switches at the cost of voltage lost in the switches can be instantiated in the following discussions.

Figure 3:
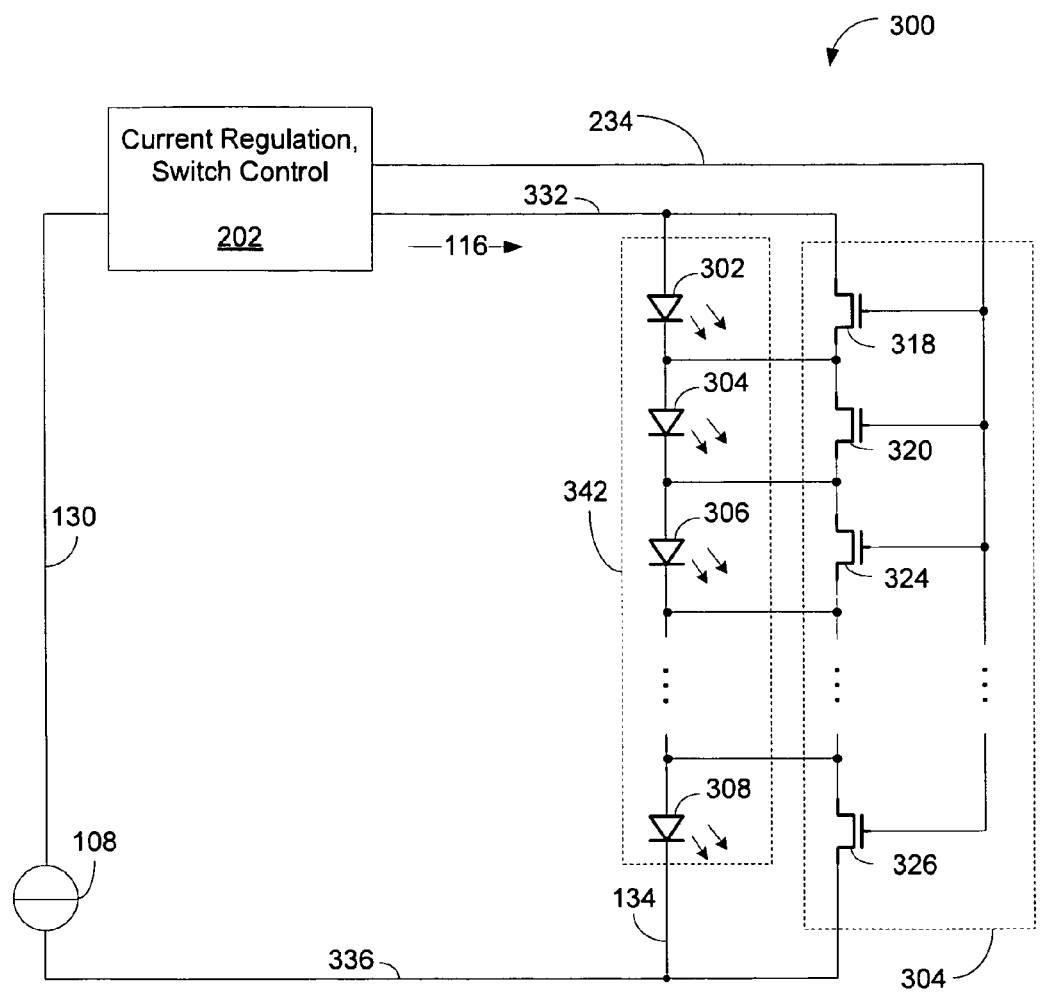
FIG. 3 is a block diagram illustrating another topology or layout of a reconfigurable LED array with a controller in accordance with an aspect of the present invention.

FIG. 3 is a block diagram illustrating another topology or layout of a lighting system 300 having a reconfigurable LED array with a controller in accordance with an aspect of the present invention. Lighting system 300 includes a controller 202, an LED reconfigurable device 304, an LED array 342, and a power supply 108, wherein LED array 242 includes multiple LEDs 302-308. Power supply 108, in an aspect, is an AC, rectified AC, and/or unregulated DC power source. It should be noted that the underlying concept of the exemplary aspect(s) of the present invention would not change if one or more elements (or LEDs) were added to or removed from diagram 300.

LED reconfiguration device 304 includes multiple switches 318-326 wherein each switch includes one or more transistors. The gate terminals or control terminals of the switches are coupled with LED control signals via bus 234 for controlling the logic status of each switch. Each switch is associated with an LED wherein the LED is turned off when its associated switch is on or active. For example, if switch 318 is on, the voltage deference across LED 302 drops to zero whereby LED 302 is turned off. Alternatively, when switches 318 and 324 are on and switch 320 is off, current 116 flows from switch 318 to LED 304, and then from LED 304 to switch 324 whereby LED 304 is activated. Note that current 116 needs to pass the switch chain from switch 318 to switch 326 to reach the negative terminal of power supply 108. It should be noted that power loss can occur in lighting system 300 when current 116 travels through each switch.

Figure 4A:
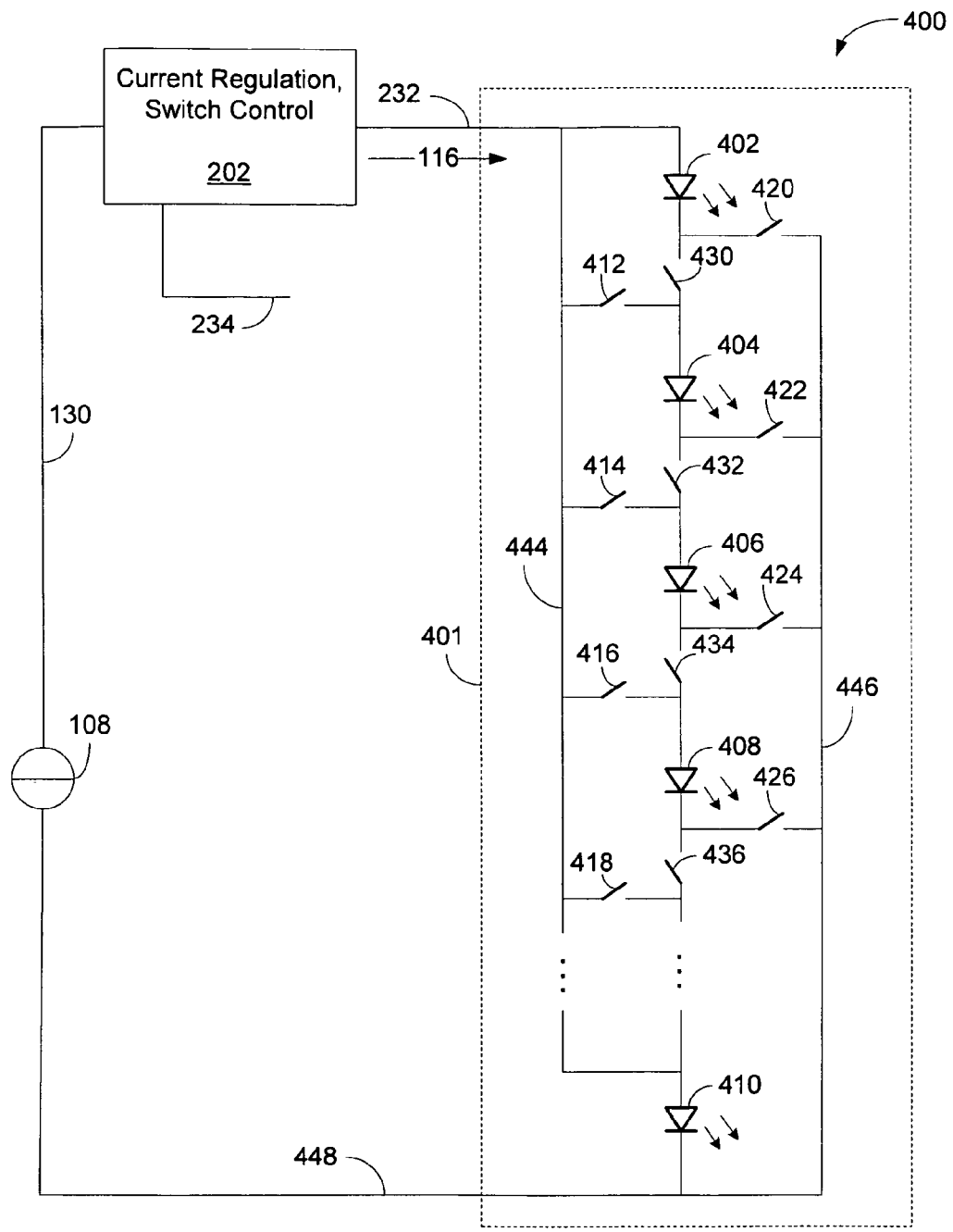
FIGS. 4A-D are block diagrams illustrating reconfigurable LED array(s) having an H-bridge operation in accordance with an aspect of the present invention.

FIG. 4A is a block diagram illustrating a lighting system 400 using a reconfigurable LED array having an H-bridge operation in accordance with an aspect of the present invention. Lighting system 400 includes a controller 202, a lighting component 401, and a power supply 108. Lighting system 400 is similar to the lighting system 200 shown in FIG. 2 except that lighting component 401 is different from lighting component 240 illustrated in FIG. 2. It should be noted that the underlying concept of the exemplary aspect(s) of the present invention would not change if one or more elements (or LEDs) were added to or removed from lighting system 400.

Lighting component 401 includes multiple LEDs 402-410 and switches 412-436 wherein switches 412-426 perform similar functions as switches 210-226. In an aspect, LEDs are coupled in a series wherein a switch is situated between every two LEDs connected in series. For example, switch 430 is placed between LEDs 402-404. Having a switch placed between every two LEDs enables controller 202 to reconfigure LEDs in parallel as well as in series. The added switches such as switches 430-436 facilitate H-bridge operation and allow the circuit to run on AC power.

Although the reconfiguration circuitry including switches 412-436 is more sophisticated than the reconfiguration circuitries illustrated in FIGS. 2-3, the circuitry allows LEDs to operate in string (or series), or parallel. For a four (4) LED array using the circuit layout illustrated in FIG. 4A, the reconfiguration circuitry allows LEDs to be reconfigured to the following configurations, one string of four (4) LEDs; one string of three (3) LEDs in two different ways; one string of two (2) LEDs in three different ways; two parallel strings of two (2) LEDs in one way; and from one to four parallel individual LEDs. If lighting component 401 is configured to be four LEDs, two parallel strings of two (2) LEDs can be configured and formed. For example, when switches 430, 422, 414, 434, and 426 are closed (or on) while switches 412, 420, 432, 416, 424, and 436 are open (or off), a first string of LEDs 402-404 is parallel with a second string of LEDs 406-408. Also, a first way of one string of three LEDs 402-406 can be formed when switches 430, 432, and 424 are closed (or on) while switches 412, 414, 434, 420, and 422 are open (or off). Alternatively, a second way of one string of three LEDs 404-408 can be formed when switches 412, 432, 434, and 426 are closed (or on) while switches 430, 414, 416, 436, and 420-424 are open (or off).

Figure 4B:
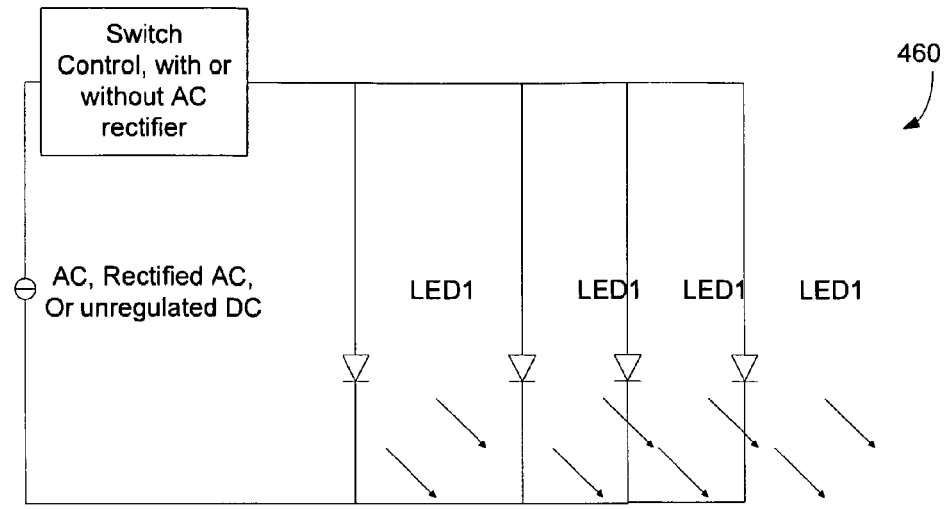
Figure 4C:
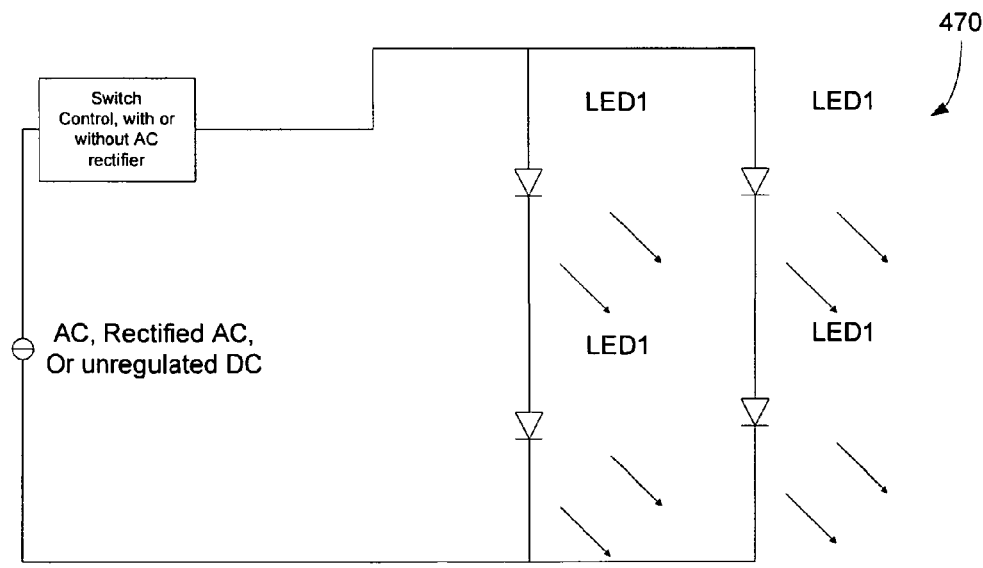
Figure 4D:
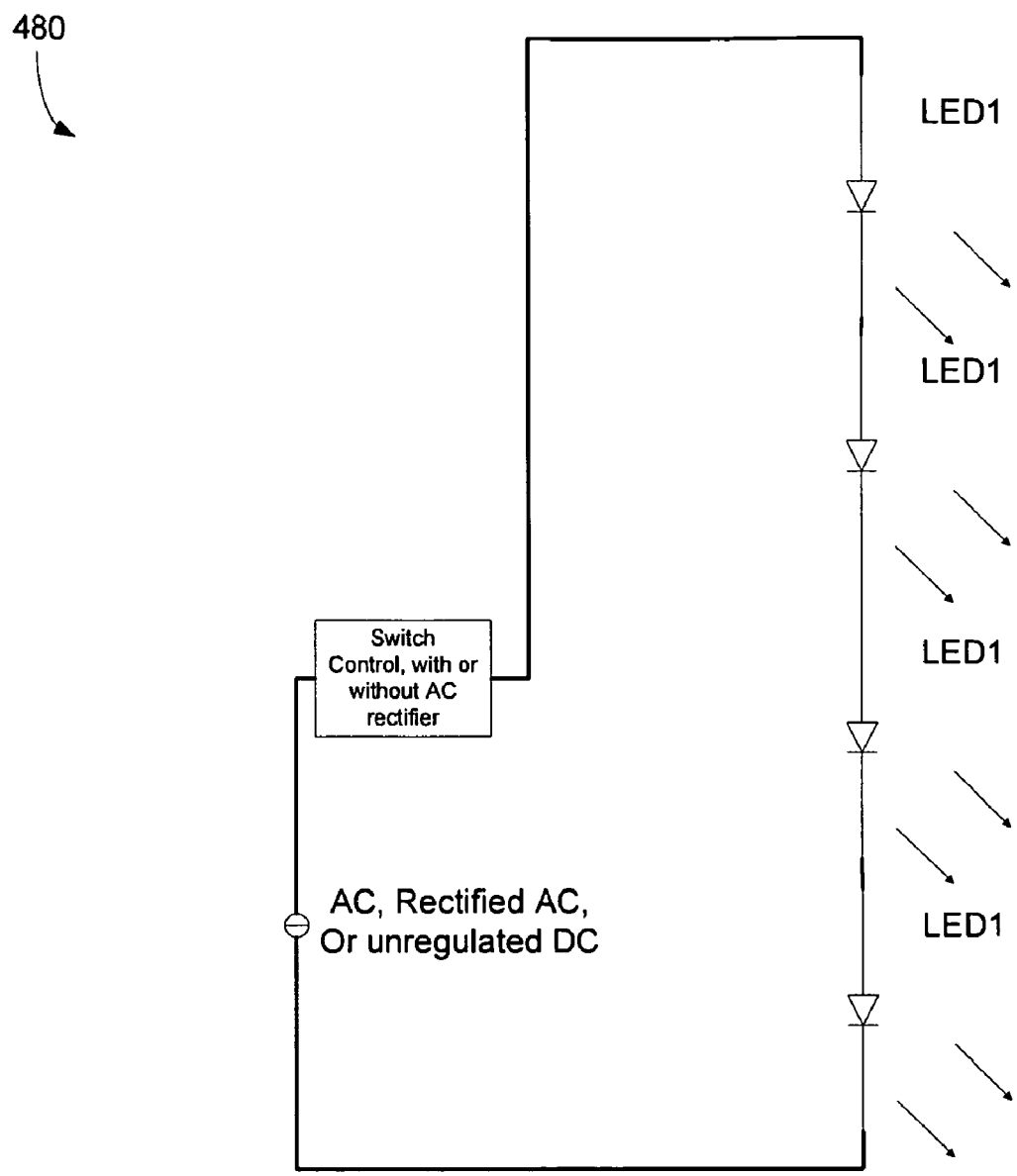

FIGS. 4B-D illustrate three (3) lighting systems having four (4) LEDs showing different LED configurations 460-480 in response to fluctuation of electrical power in accordance with an aspect of the present invention. Switches or switching devices organized in an H-bridge layout as shown in FIG. 4A can be used to generate various LED configurations. While configuration 460, for example, illustrates four parallel strings of one LED, configuration 470 shows two parallel strings of two LEDs. Configuration 480 on the other hand depicts a configuration of one string of four LEDs.

Configurations 460-480, shown in FIGS. 4B-D, are capable of operating the LED array efficiently and allowing the LED array to deliver the same amount of light with various input voltages. FIGS. 4B-D illustrate schematically circuit devices with a four-LED array. FIG. 4B shows the LED array configured with four (4) parallel individual LEDs. During a period of low voltage (i.e. 3.2 V for a blue LED), configuration 460 could draw a high current (i.e. 1.4 A) and each LED would consume a constant power (i.e. 1.2 W) and deliver the associated amount of light. When the supply is at a moderate voltage (i.e. 6.4 V), the LED array is reconfigured to two (2) parallel stings of two (2) LEDs, and draws half the current (i.e. 0.7 A) as configuration 470 illustrated FIG. 4C. Configuration 470 still delivers the same power (i.e. 1.2 W) to each LED and would provide the same amount of light with the same efficiency as configuration 460 illustrated in FIG. 4B. Alternatively, when the supply reaches a high voltage (i.e. 13.2 V), the LED array is reconfigured to be one string of four (4) LEDs, illustrated in FIG. 4D and draws one-quarter the current (i.e. 0.35 A) as configuration 460 illustrated FIG. 4B. Configuration 480 again delivers the same or similar power (i.e. 1.2 W) to each LED and would provide the same amount of light with the same efficiency as configurations 460-470 shown FIGS. 4B-C. It should be noted that as electrical potential ("voltage") increases, the number of active LEDs remains the same and the delivered electrical power is the same while the configuration of LEDs changes in accordance with the output of electrical potential. In some applications, it is beneficial to turn off LEDs as the electrical power rises and turn on LEDs as the electrical power decreases.

The reconfiguration circuitry illustrated in FIG. 4 allows an LED array and/or LED system to adapt to the voltage applied with dynamic real-time control facilitated by controller 202. Controller 202, which could be an external circuit, is integrated into the LED module. An advantage of using such LED modules is to allow an LED array to work without AC-to-DC converter. Another advantage of using the LED module is to remove the electrolytic capacitors from the system because electrolytic capacitors tend to reduce the lifetime of a system.

Figure 5:
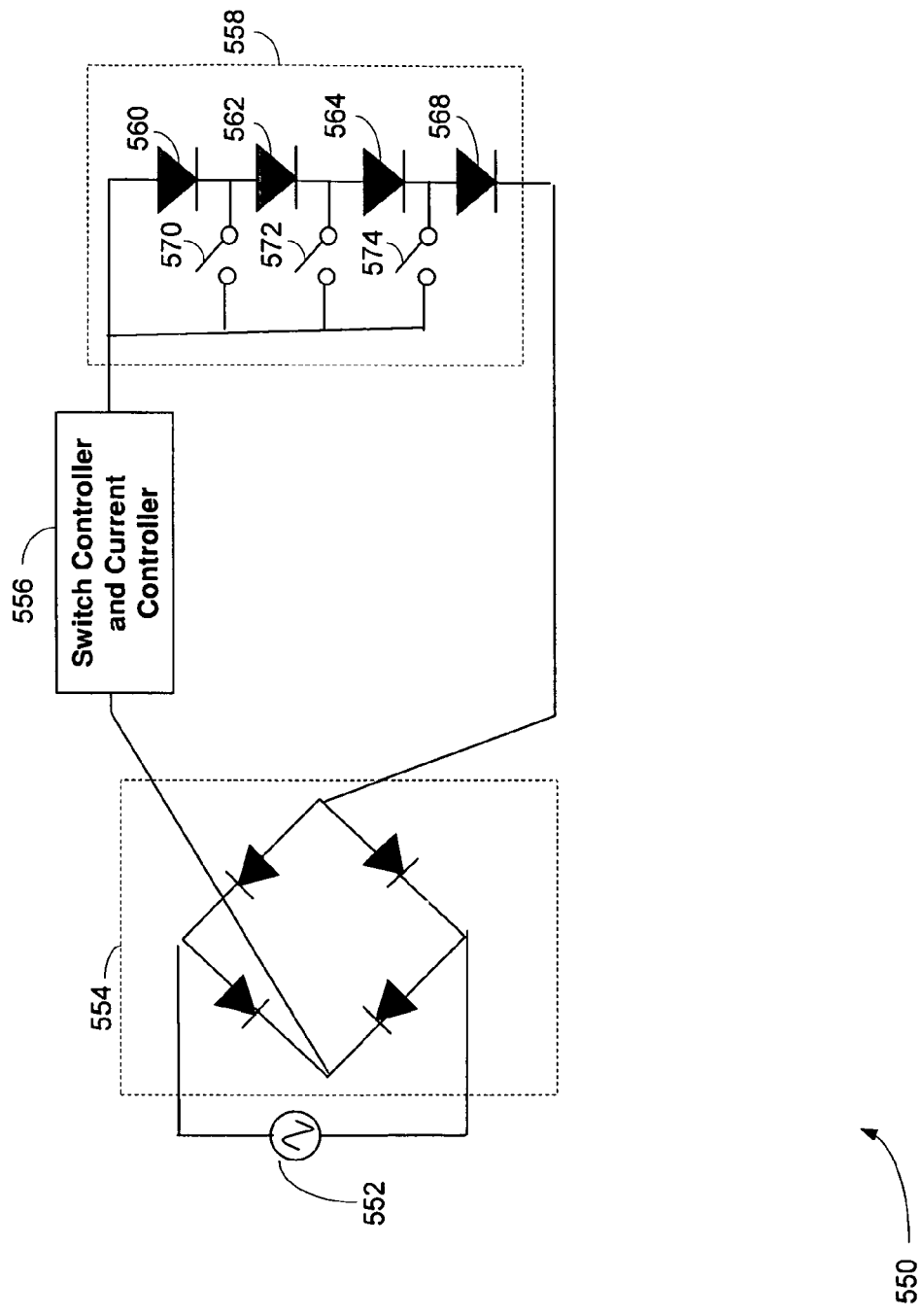
FIGS. 5-9 illustrate exemplary AC LED topologies showing a reconfigurable LED array in accordance with an aspect of the present invention.

FIG. 5 illustrates an exemplary AC LED topology 550 showing a reconfigurable LED array in accordance with an aspect of the present invention. Topology 550 includes a power supply 552, a rectifier 554, a controller 556, and a reconfigurable LED array 558. Controller 556, in an aspect, includes a switch controller and a current controller wherein the switch controller is capable of managing switches. Current controller is capable of forwarding electrical current from rectifier 554 to reconfigurable LED array 558. It should be noted that the underlying concept of the exemplary aspect (s) of the present invention would not change if one or more elements (or LEDs) were added to or removed from diagram 550.

Rectifier 554 includes four (4) diodes capable of blocking the negative and/or positive portion of the waveform. Any other types of power rectifier may be used in place of rectifier 554. Power supply 552 can be an AC power source supplied by a utility company via power cables. Alternatively, power supply 552 is an unregulated DC power source provided by a power generator.

Reconfigurable LED array 558 includes three (3) switches 570-574 and four (4) LEDs 560-568 wherein LEDs 560-568 are coupled in series or in a string. Note that switches 570-574 are similar to switches 110-114 illustrated in FIG. 1 and LEDs 560-568 are similar to LEDs 120-126 shown in FIG. 1. While LED 568 is on most of the time, LEDs 560-564 can be turned on or off by switches 570-574. The logic status of switches 570-576 are controlled by LED control signals controlled and/or managed by controller 556.

An advantage of using topology 550 is to allow LEDs to draw power directly from AC or unregulated power sources without AC to DC conversion.

To measure the performance of an LED lighting system, the measurement encompasses various parameters, such as flux, power factor, and efficiency. While ideal rate of flux is approximately 880 lm, the desirable power factor is greater than 0.9. For instance, if an individual LED produces 75 lm/W of cool white light with 700 mA of current and a forward voltage of 3.2 V, it can produce approximately 175 lm of flux. If flux and efficiency are maintained within a pre-defined range, the forward voltage (in increments of 3.2V) and current can be reshaped to provide a power density that is approximately constant. As such, the LED can produce 175 lm of flux with a forward voltage of 6.4V and 350 mA or 9.6 V and 267 mA or 12.8V and 175 mA, et cetera.

The efficiency, in one example, includes LED efficacy, system efficacy, and AC to DC efficiency. The definitions of efficiency are listed below.

$$LED\ Efficacy = \frac{Flux\ (L)}{Power\ (W)\ to\ LED}$$

$$System\ Efficacy = \frac{Flux\ (L)}{Total\ Power\ (W)\ to\ system\ (LED + Driver)}$$

$$AC\ to\ DC\ Efficiency = \frac{Power\ delivered\ to\ LED}{Power\ delivered}$$

To attain high power factor, the line current delivered, for example, should be in phase with the line voltage. The power delivered to the system will then be approximately the square of the sine function which has an average to peak ratio of 0.5. To obtain 880 lm average fluxes, LEDs, for example, need to produce 1760 lm at the peak, which suggests that the lighting system may require having at least ten (10) LEDs to fulfill the flux requirement. For example, with 170 V peak of AC line voltage, an LED or a set of LEDs should have a forward voltage of 16 V at a current of 140 milliamps ("mA"). Note that if the circuit includes an inline resistor, the difference between LED voltage and line voltage should be kept low to improve system efficiency.

Figure 6:
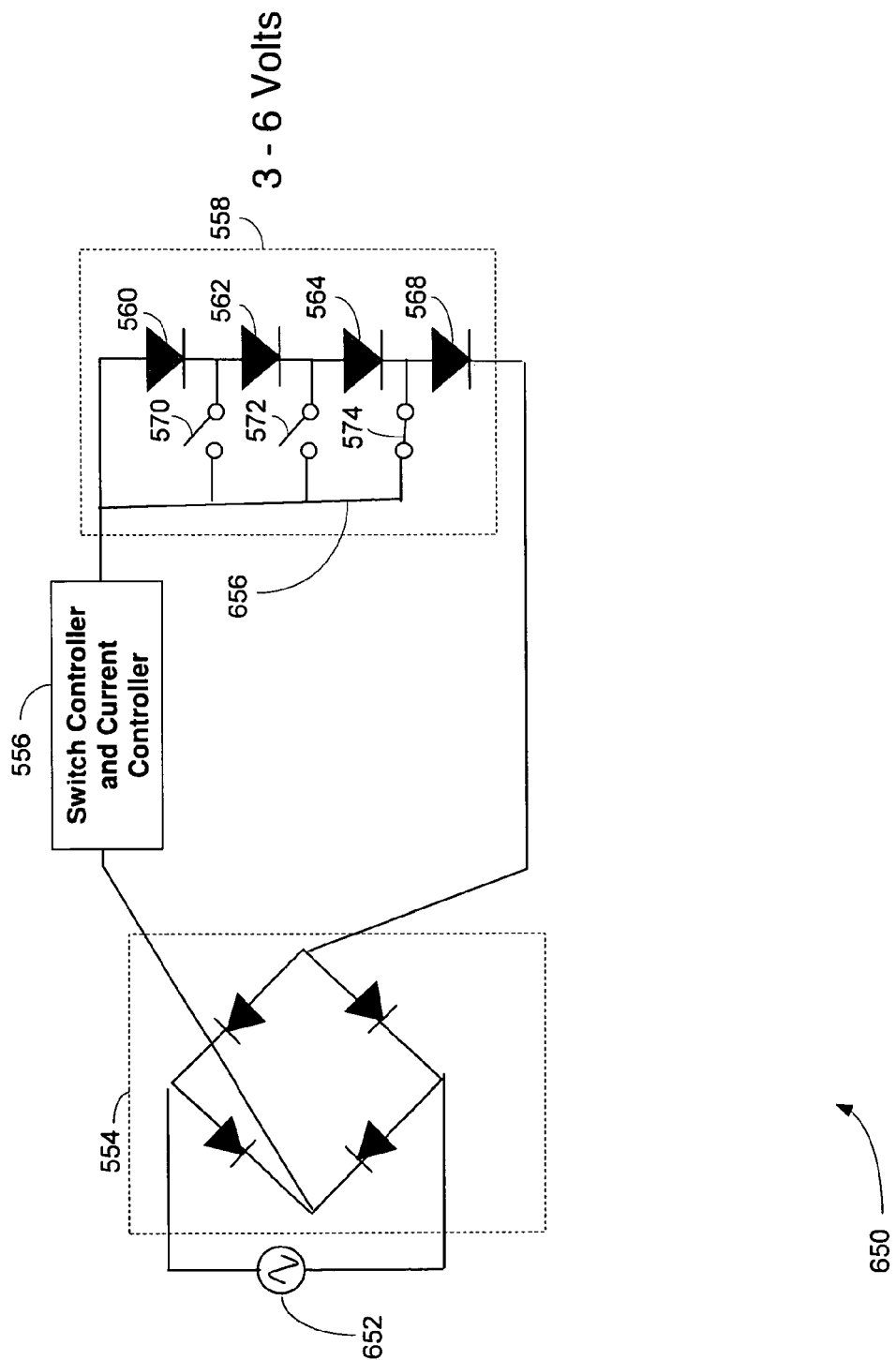

FIG. 6 is block diagram illustrating an exemplary implementation of AC LED topology 650 having a reconfigurable LED array in accordance with an aspect of the present invention. Topology 650, similar to topology 550 shown in FIG. 5, includes a power supply 652, a rectifier 554, a controller 556, and a reconfigurable LED array 558. Note that additional LEDs and switches can be added to reconfigurable LED array 558. It should be noted that the underlying concept of the exemplary aspect(s) of the present invention would not change if one or more elements (or LEDs) were added to or removed from diagram 650.

When power supply 652 increases voltage from 0 volt ("V") to 3-6 V, the variable forwarding current is forwarded from rectifier 554 to controller 556. Upon detection of 3-6 V of forwarding voltage, switch controller sends an LED control signal to activate switch 574. When switches 570-572 are inactivated and switch 574 is activated, the forwarding current bypasses LEDs 560-564 and reaches to LED 568 directly through switch 574 via a connection 656. A lighting fixture employing a variable voltage forward LED package is capable of minimizing the voltage difference between the power supply and the LEDs by activating or deactivating LEDs as needed. Depending on the applications, more sophisticated switching circuits may be used to provide additional flexibility for LED reconfiguration.

Figure 7:
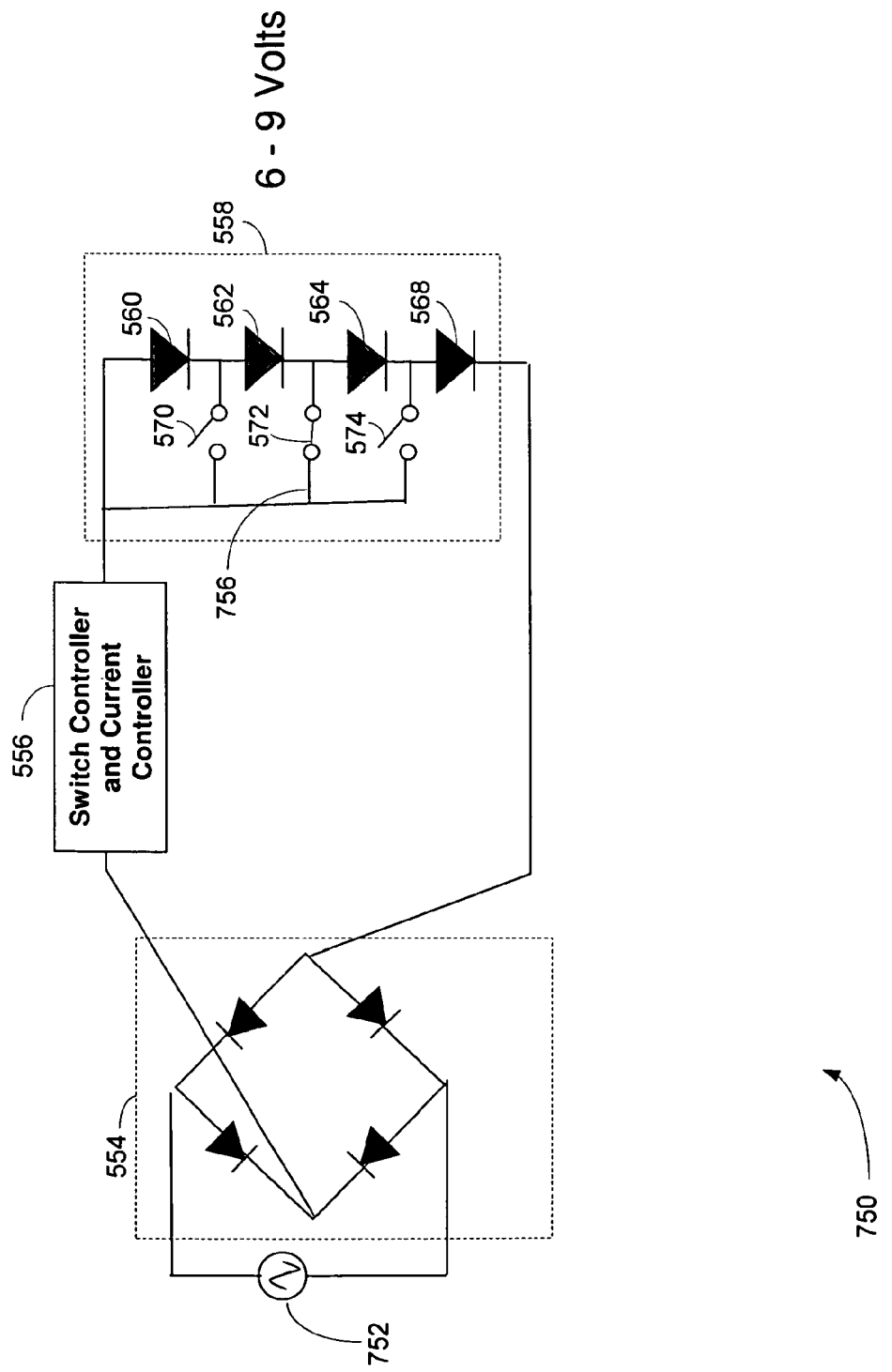

FIG. 7 is block diagram illustrating an exemplary implementation of AC LED topology 750 having a reconfigurable LED array in accordance with an aspect of the present invention. Topology 750, similar to topology 550 shown in FIG. 5, includes a power supply 752, a rectifier 554, a controller 556, and a reconfigurable LED array 558. Note that additional LEDs and switches can be added to reconfigurable LED array 558. It should be noted that the underlying concept of the exemplary aspect(s) of the present invention would not change if one or more elements (or LEDs) were added to or removed from diagram 750.

When power supply 752 increases voltage from 3-6V to 6-9 V, the variable forwarding voltage is forwarded from power rectifier 554 to controller 556. Upon detection of 6-9 V of forwarding voltage, switch controller sends an LED control signal to activate switch 572. When switches 570 and 574 are inactivated and switch 572 is active, the forward voltage or current bypasses LEDs 560-562 and reaches to LEDs 564-568 through switch 572 via a connection 756. A lighting fixture employing variable voltage forward LED package is capable of keeping minimum voltage difference between the power supply and the LEDs by activating or deactivating LEDs as needed.

Figure 8:
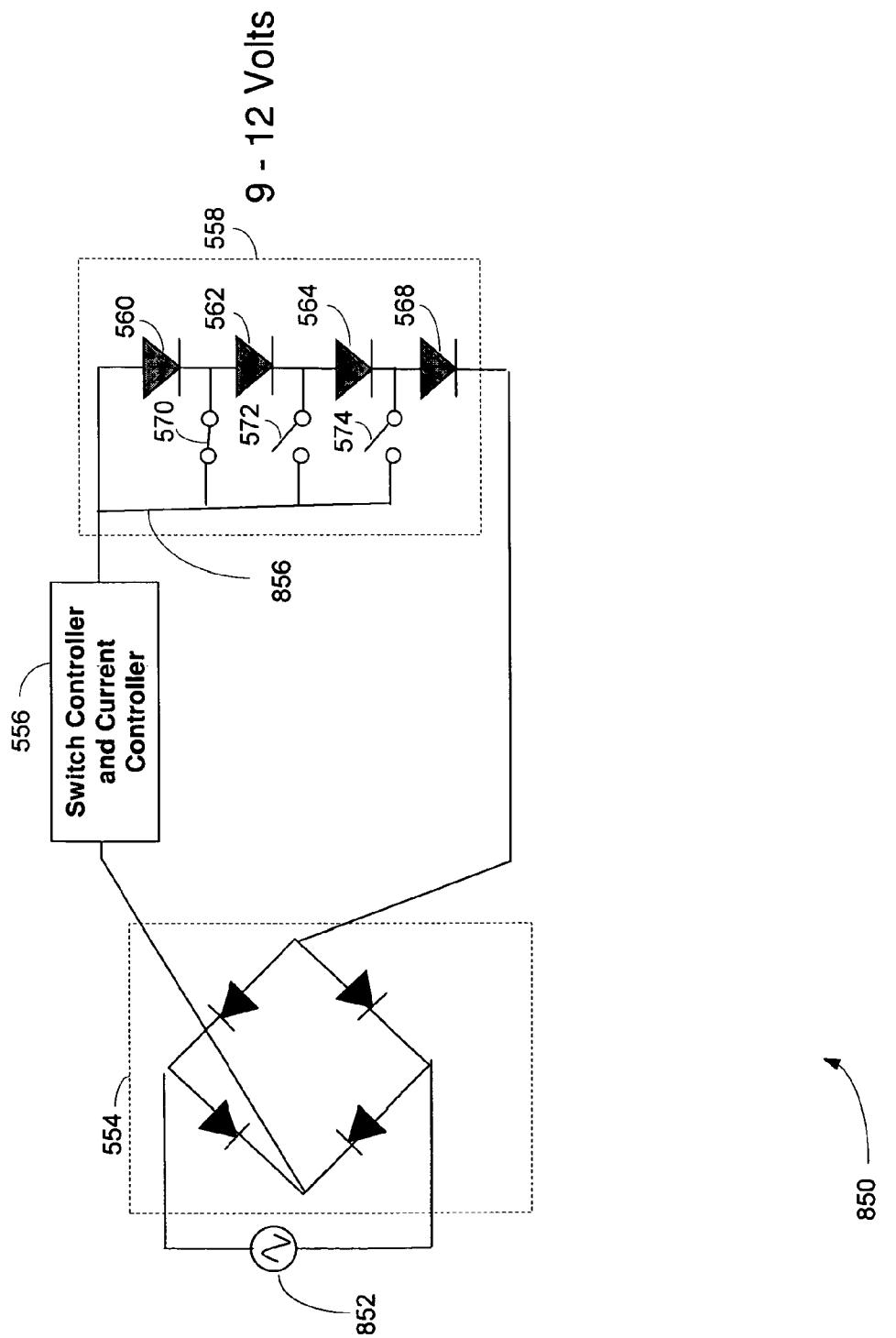

FIG. 8 is block diagram illustrating an exemplary implementation of AC LED topology 850 having a reconfigurable LED array in accordance with an aspect of the present invention. Topology 850, similar to topology 550 shown in FIG. 5, includes a power supply 852, a rectifier 554, a controller 556, and a reconfigurable LED array 558. Note that additional LEDs and switches can be added to reconfigurable LED array 558. It should be noted that the underlying concept of the exemplary aspect(s) of the present invention would not change if one or more elements (or LEDs) were added to or removed from diagram 850.

When power supply 852 increases voltage from 6-9V to 9-12V, the variable forwarding voltage is forwarded from power rectifier 554 to controller 556. Upon detection of 9-12V of forwarding voltage, switch controller sends an LED control signal to activate switch 570. When switches 572-574 are inactivated and switch 570 is activated, the forward current bypasses LED 560 and reaches to LEDs 562-568 through switch 570 via a connection 856.

Another application of a reconfigurable LED array is to provide alternatives to dimming via current modulation. Conventional methods to dim LED focus on modulating the current through an LED either in time or in amplitude. In general, voltage dimming for a conventional LED is not preferred since large light output changes are induced with only small variations in voltage. With a reconfigurable LED array, stepped voltage dimming can be performed by turning on LEDs as the electrical power increases and turning off LEDs as the electrical power decreases.

Figure 9:
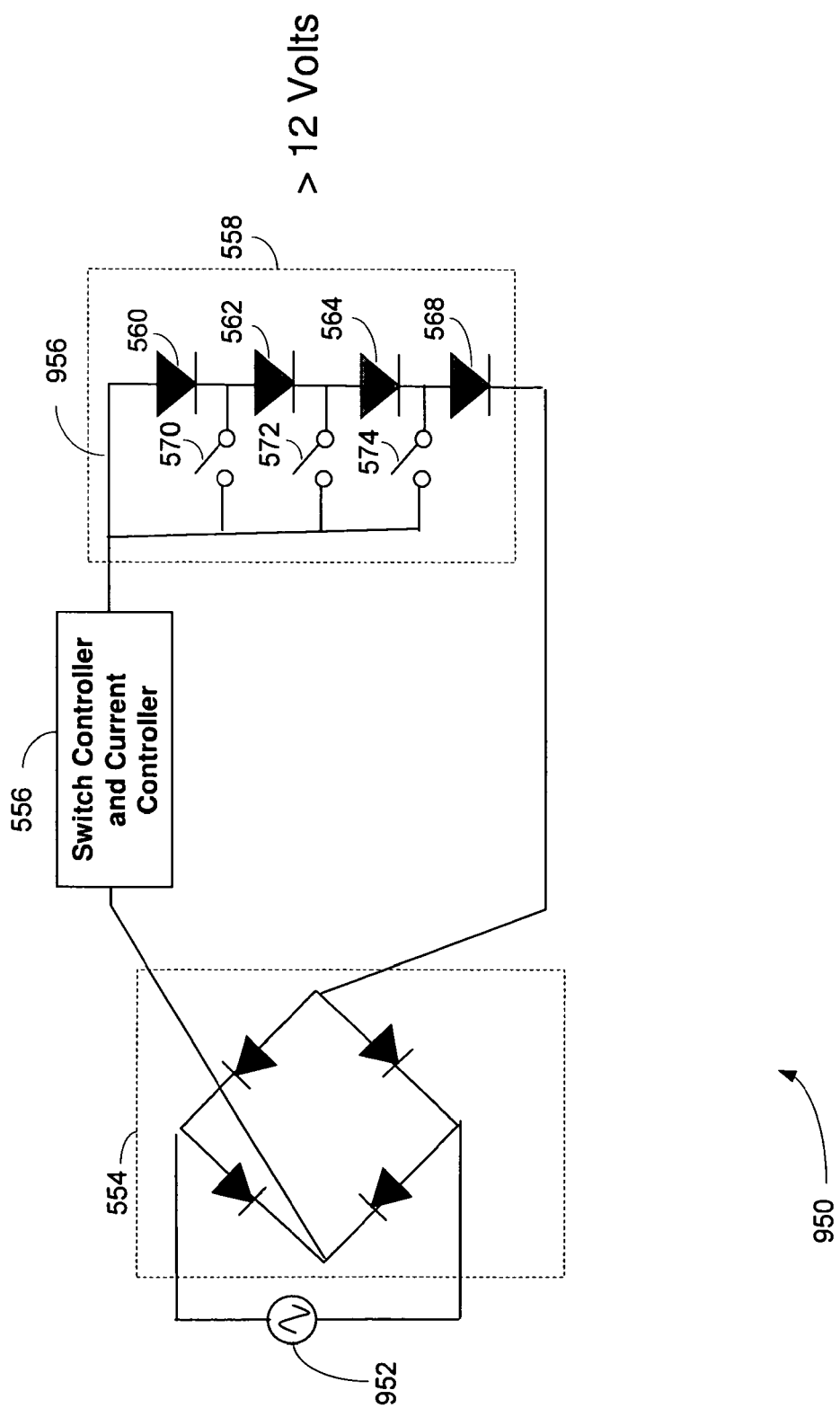

FIG. 9 is block diagram illustrating an exemplary implementation of AC LED topology 950 having a reconfigurable LED array in accordance with an aspect of the present invention. Topology 950, similar to topology 550 shown in FIG. 5, includes a power supply 952, a rectifier 554, a controller 556, and a reconfigurable LED array 558. Note that additional LEDs and switches can be added to reconfigurable LED array 558. It should be noted that the underlying concept of the exemplary aspect(s) of the present invention would not change if one or more elements (or LEDs) were added to or removed from diagram 950.

When power supply 952 increases voltage from 9-12V to greater than 12V, the variable forwarding voltage is forwarded from rectifier 554 to controller 556. Upon detecting a voltage greater than 12V of forwarding voltage, switch controller switches off all switches 570-574 via LED control signals. When switches 570-574 are inactivated, the forward current reaches to LEDs 560-568 via a connection 956. It should be noted that additional switches and LEDs may be included if higher forwarding voltage occurs.

Figure 10:
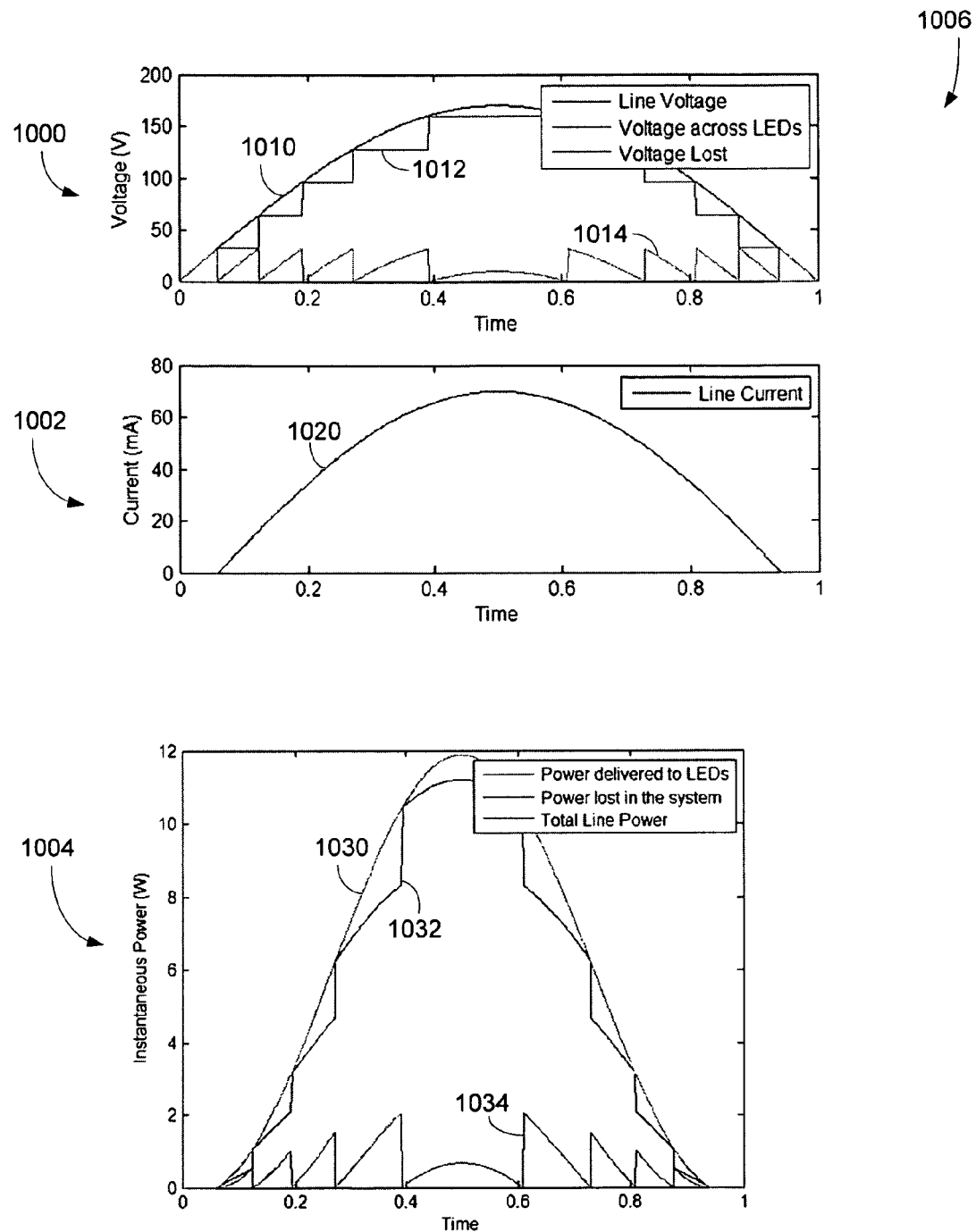
FIG. 10 is a diagram showing a set of graphs illustrating the performance of power delivery to a lighting system using a reconfigurable LED array in accordance with an aspect of the present invention.

FIG. 10 is a diagram 1006 showing a set of graphs illustrating the performance of power delivery to a lighting system using a reconfigurable LED array in accordance with an aspect of the present invention. Diagram 1006 includes a voltage graph 1000, a current graph 1002, and a power graph 1004. Data collected and plotted on graphs 1000-1004 is based on a set of predefined parameters such as power factor and flicker index. Flicker index measures the amount of light above the average amount of light. Power factor provides a ratio of the real power applied to a load and the apparent power. Graphs 100-104 are plotted under the following conditions: power factor equals 0.995; flicker index equals 0.34; 50 junctions over 160 V.

Graph 1000 illustrates a line voltage curve 1010, a voltage across LEDs curve 1012, and a voltage loss curve 1014 over a time domain. Curves 1010-1014 plotted in graph 1000 demonstrate that the lighting system is fairly efficient since voltage across LEDs curve 1012 is similar to line voltage curve 1010. Also, voltage loss curve 1014 is relatively small in comparison with voltage across LEDs curve 1012.

Graph 1002 illustrates a plot showing a line current curve 1020 over a time domain. It is noted that the voltage loss 1014 represents approximate power loss to circuitry somewhere in the system that is unrecoverable. The power delivered to the LEDs plotted over one cycle is shown in graph 1004. Graph 1004 shows a line power curve 1030, a power delivered to LEDs curve 1032, and a power loss curve 1034. Graph 1004 illustrates that power delivery to a system is fairly efficient because power delivered curve 1032 is very close to line power curve 1030. Also, power loss curve 1034 is relatively small in comparison with the power delivered curve 1032. As such, an advantage of using the reconfigurable LED array is to provide an LED system that can run on AC, rectified AC and/or unregulated DC power source.

Figure 11:
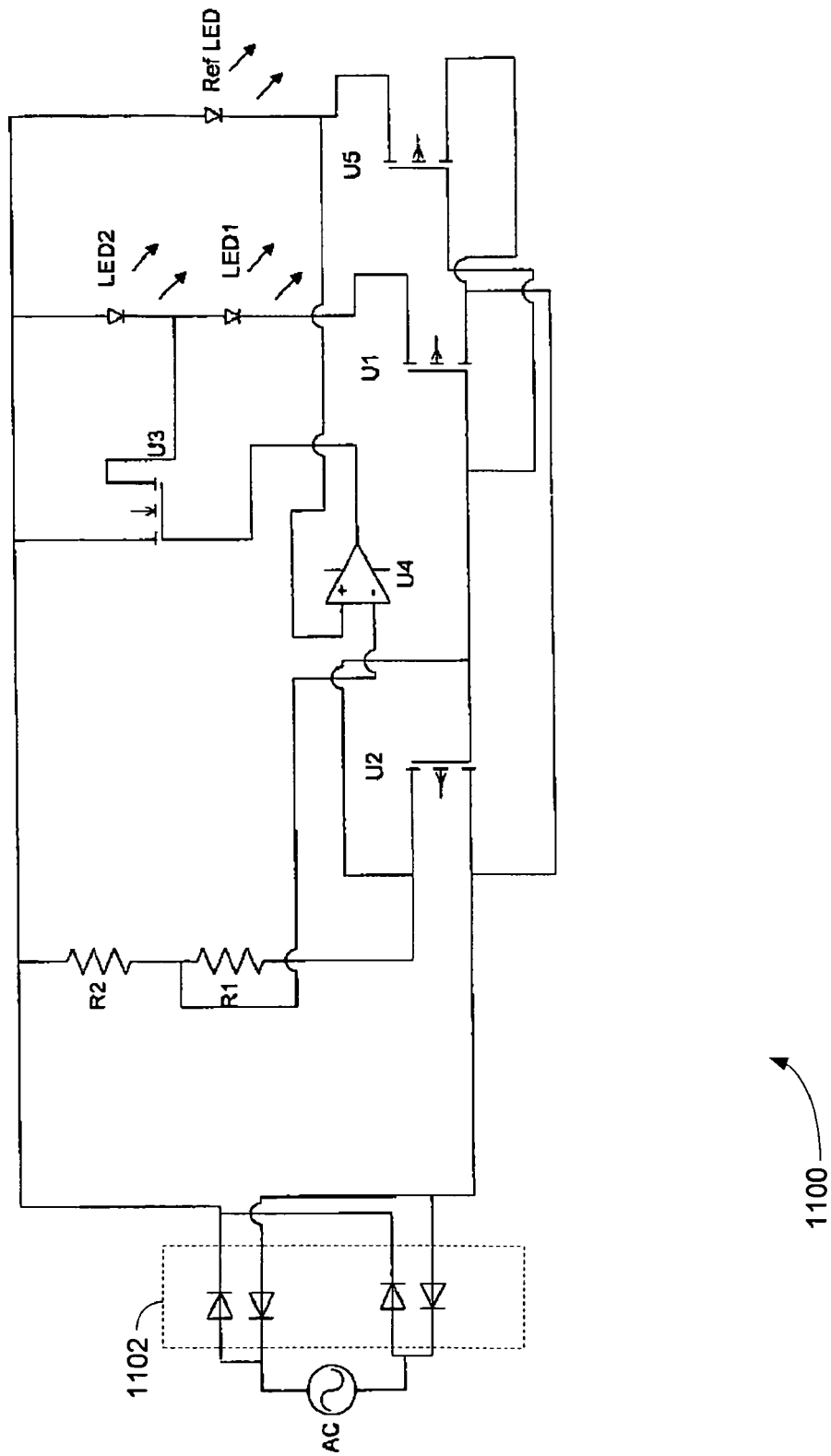
FIG. 11 is a block diagram illustrating a control circuit for controlling a reconfigurable LED array in accordance with an aspect of the present invention.

FIG. 11 is a block diagram 1100 illustrating a control circuit, such as controller 202 shown in FIG. 2, for controlling a reconfigurable LED array in accordance with an aspect of the present invention. Diagram 1100 includes an AC power supply, a wave rectifier 1102, resistors R1-R2, an LED1, an LED2, transistors U1-U5, and a reference LED. It should be noted that the underlying concept of the exemplary aspect(s) of the present invention would not change if one or more elements (or devices) were added to or removed from diagram 1100.

Diagram 1100 is a circuit capable of performing tasks on a two-LED system. Wave rectifier 1102 is used for the AC line voltage. R1 and R2 facilitate a current passing though transistor U2 and the current is in phase with the line voltage. Transistor U1 mirrors the current through U2 in the standard current mirror topology. Transistor U3 is capable of shorting across LED2 when the drain voltage of U5 is larger than the voltage which is set by the voltage divider of R1 and R2. Comparator U4, also known as differential amplifier, becomes active and pulls U3 low before U1 and LED1 turn on. In one example, it may be advantageous to have a large forward voltage for LED1. To provide the appropriate voltage for switching, a small reference LED is placed at the drain of U5. It should be noted that the switching circuit including U3, U4 and the resistor network can be duplicated for the LED array having more than two (2) LEDs. Note that a requirement may be that any comparators have to operate at a fairly large supply voltage range.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 12:
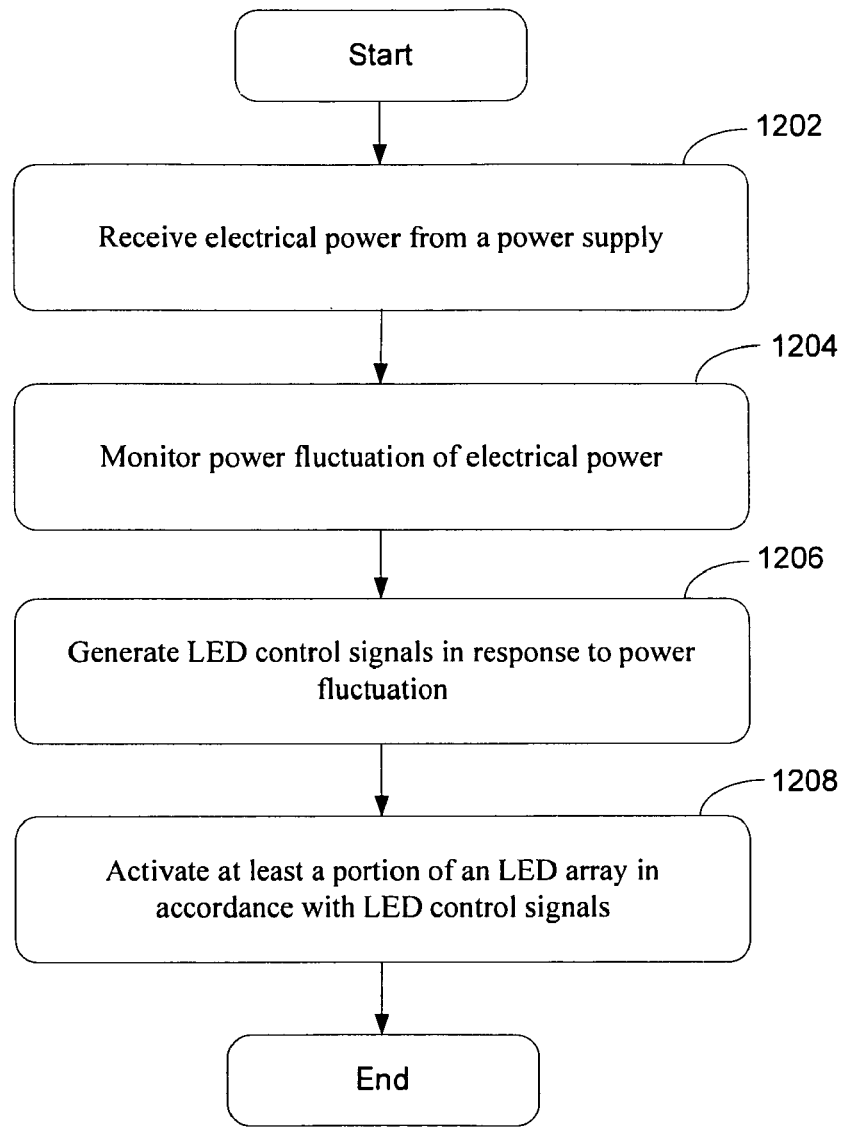
FIG. 12 is a flowchart illustrating a process of reconfiguring an LED array using a controller in accordance with an aspect of the present invention.

FIG. 12 is a flowchart 1200 illustrating a process of reconfiguring an LED array using a controller in accordance with an aspect of the present invention. At block 1202, a process for generating light receives electrical power from a power supply. The process, in an aspect, is capable of accepting power from an AC power supply.

At block 1204, the process is capable of monitoring fluctuation of the electrical power. The voltage fluctuation and/or current fluctuation of the AC power supply can be detected.

At block 1206, the process generates LED control signals in response to the power fluctuation of the electrical power. In an aspect, the process is capable of reconfiguring the LED array in accordance with the plurality of LED control signals.

At block 1208, the process activates at least a portion of an LED array in accordance with logic states of the LED control signals. After dynamically updating logic states of the LED control signals in accordance with dynamic fluctuation of the electrical power, the process dynamically activates and/or deactivates LEDs of the LED array in response to the logic states of the LED control signals. Depending on the applications, some switches are positive enabling while other switches are negative enabling. Positive enabling means that a switch, for example, is triggered or turned-on (or closed) by an active state of a control signal, while negative enabling means that a switch is triggered and turned-on by an inactive state of a control signal. The active and/or inactive states of control signals can be implemented by digital processing circuitry, analog processing circuitry, or a fixed-signal processing circuitry.

The active and inactive states, in some digital processing applications, are also known as logic "1" and logic "0" states, respectively. In an aspect, active state or logic "1" state means high voltage state while inactive state or logic "0" state means low voltage state. Depending on applications, active state or logic "1" state can alternatively be configured as low voltage state while inactive state or logic "0" state can be configured as high voltage state. For example, the process is capable of setting additional active states of the LED control signals when the electrical power increases. The process, on the other hand, is also capable of setting additional inactive states of the LED control signals when the electrical power decreases.

Having briefly described aspects of lighting systems capable of directly drawing AC and/or unregulated DC power using a reconfigurable LED array in which the present invention operates, the following figures illustrate exemplary process and/or method to fabricate and package LED dies, chips, device, and/or fixtures.

Figure 13:
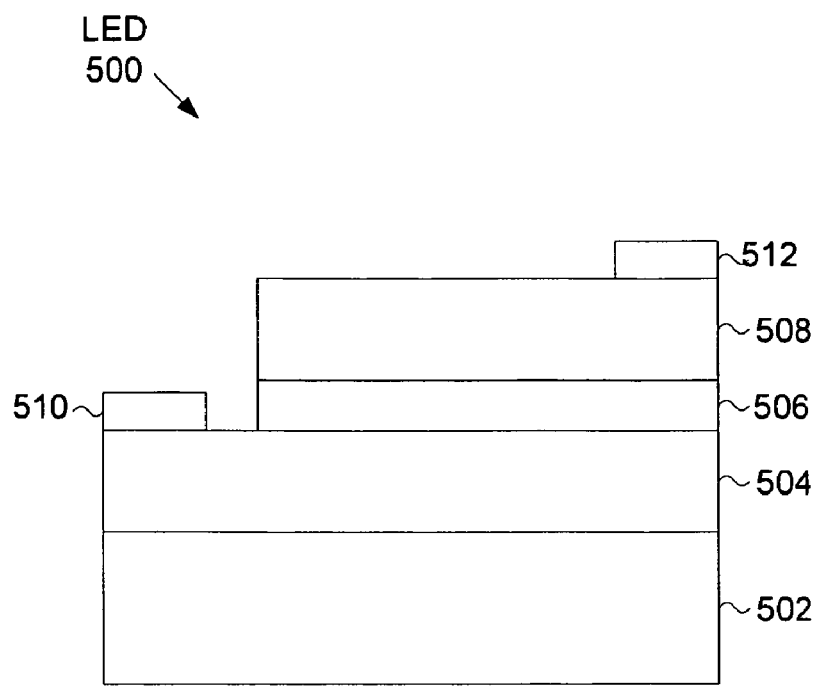
FIG. 13 is a conceptual cross-sectional view illustrating an example of an LED.

FIG. 13 is a conceptual cross-sectional view illustrating an exemplary fabrication process of an LED or LED devices. An LED is a semiconductor material impregnated, or doped, with impurities. These impurities add "electrons" or "holes" to the semiconductor, which can move in the material relatively freely. Depending on the kind of impurity, a doped region of the semiconductor can have predominantly electrons or holes, and is referred respectively as n-type or p-type semiconductor regions. Referring to FIG. 13, the LED 500 includes an n-type semiconductor region 504 and a p-type semiconductor region 508. A reverse electric field is created at the junction between the two regions, which causes the electrons and holes to move away from the junction to form an active region 506. When a forward voltage sufficient to overcome the reverse electric field is applied across the p-n junction through a pair of electrodes 510, 512, electrons and holes are forced into the active region 506 and recombine. When electrons recombine with holes, they fall to lower energy levels and release energy in the form of light.

In this example, the n-type semiconductor region 504 is formed on a substrate 502 and the p-type semiconductor region 508 is formed on the active layer 506, however, the regions may be reversed. That is, the p-type semiconductor region 508 may be formed on the substrate 502 and the n-type semiconductor region 504 may be formed on the active layer 506. As those skilled in the art will readily appreciate, the various concepts described throughout this disclosure may be extended to any suitable layered structure. Additional layers or regions (not shown) may also be included in the LED 500, including but not limited to buffer, nucleation, contact and current spreading layers or regions, as well as light extraction layers.

The p-type semiconductor region 508 is exposed at the top surface, and therefore, the p-type electrode 512 may be readily formed thereon. However, the n-type semiconductor region 504 is buried beneath the p-type semiconductor layer 508 and the active layer 506. Accordingly, to form the n-type electrode 510 on the n-type semiconductor region 504, a cutout area or "mesa" is formed by removing a portion of the active layer 506 and the p-type semiconductor region 508 by means well known in the art to expose the n-type semiconductor layer 504 there beneath. After this portion is removed, the n-type electrode 510 may be formed.

Figure 14:
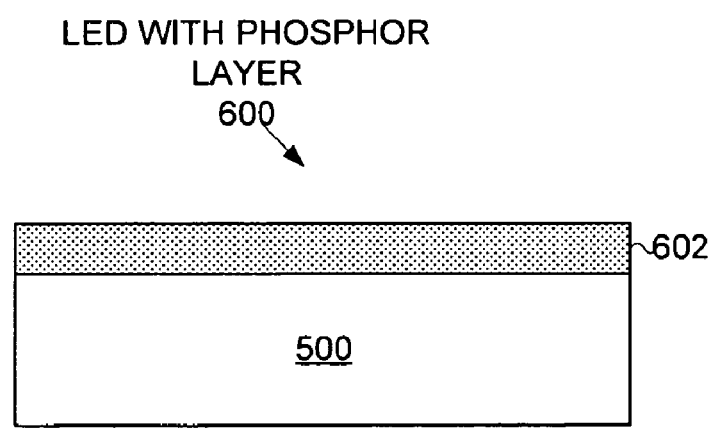
FIG. 14 is a conceptual cross-sectional view illustrating an example of an LED with a phosphor layer.

FIG. 14 is a conceptual cross-sectional view illustrating an example of an LED with a phosphor layer. In this example, a phosphor layer 602 is formed on the top surface of the LED 500 by means well known in the art. The phosphor layer 602 converts a portion of the light emitted by the LED 500 to light having a different spectrum from that emitted from the LED 500. A white LED light source can be constructed by using an LED that emits light in the blue region of the spectrum and a phosphor that converts blue light to yellow light. A white light source is well suited as a replacement lamp for conventional luminaries; however, the invention may be practiced with other LED and phosphor combinations to produce different color lights. The phosphor layer 602 may include, by way of example, phosphor particles suspended in a carrier or be constructed from a soluble phosphor that is dissolved in the carrier.

Figure 15A:
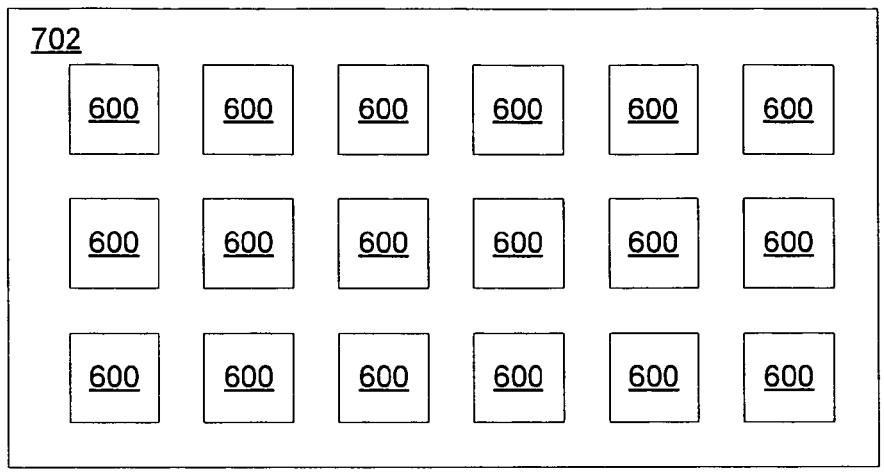
FIG. 15A is a conceptual top view illustrating an example of an LED array.
Figure 15B:
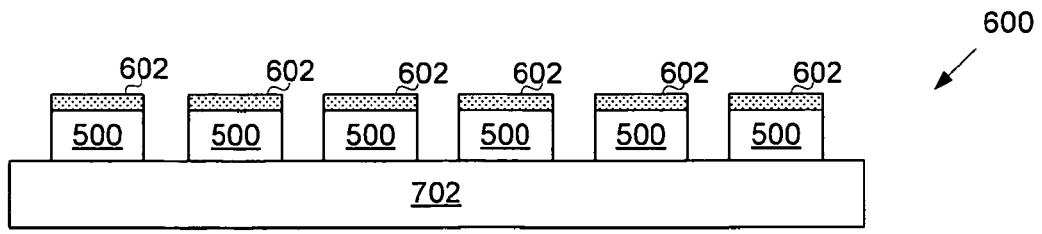
FIG. 15B is a conceptual cross-sectional view of the LED array of FIG. 15A.

In a configuration of LED luminaries, an LED array may be used to provide increased luminance. FIG. 15A is a conceptual top view illustrating an example of an LED array, and FIG. 15B is a conceptual cross-sectional view of the LED array of FIG. 15A. In this example, a number of phosphor-coated LEDs 600 may be formed on a substrate 702. The bond wires (not shown) extending from the LEDs 600 may be connected to traces (not shown) on the surface of the substrate 702, which connect the LEDs 600 in a parallel and/or series fashion. Typically, the LEDs 600 may be connected in parallel streams of series LEDs with a current limiting resistor (not shown) in each stream. The substrate 702 may be any suitable material that can provide support to the LEDs 600 and can be mounted within a light fixture (not shown).

Figure 16A:
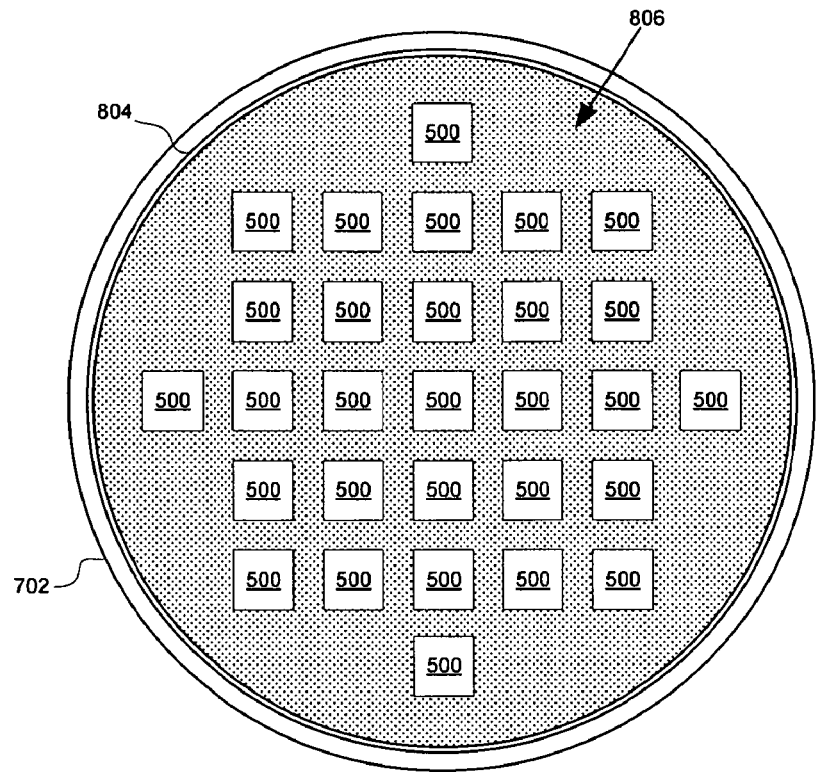
FIG. 16A is a conceptual top view illustrating an example of an alternative configuration of an LED array.
Figure 16B:
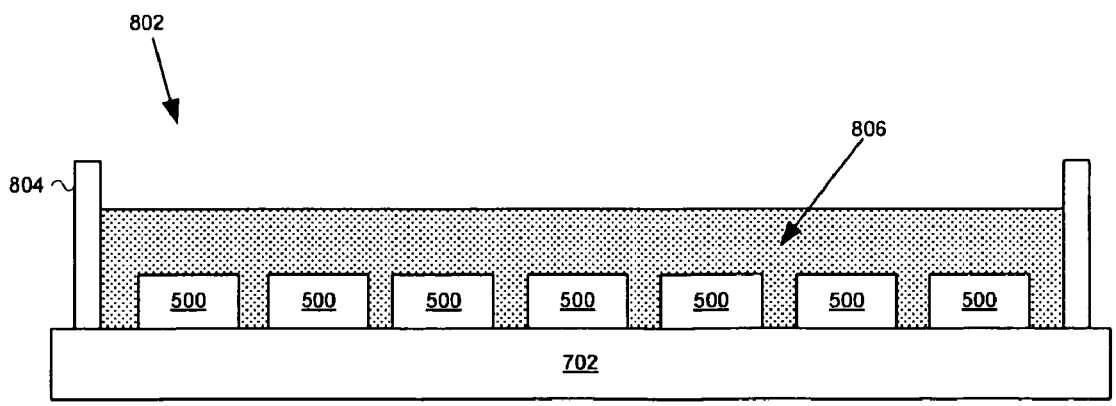
FIG. 16B is a conceptual cross-sectional view of the LED array of FIG. 16A.

FIG. 16A is a conceptual top view illustrating an example of an alternative configuration of an LED array, and FIG. 16B is a conceptual cross-sectional view of the LED array of FIG. 16A. In a manner similar to that described in connection with FIGS. 15A and 15B, a substrate 702 designed for mounting in a light fixture (not shown) may be used to support an array of LEDs 500. However, in this configuration, a phosphor layer is not formed on each individual LED. Instead, phosphor 806 is deposited within a cavity 802 bounded by an annular ring 804 that extends circumferentially around the outer surface of the substrate 702. The annular ring 804 may be formed by boring a cylindrical hole in a material that forms the substrate 702. Alternatively, the substrate 702 and the annular ring 804 may be formed with a suitable mold, or the annular ring 804 may be formed separately from the substrate 702 and attached to the substrate using an adhesive or other suitable means. In the latter configuration, the annular ring 804 is generally attached to the substrate 702 before the LEDs 500, however, in some configurations, the LEDs may be attached first. Once the LEDs 500 and the annular ring 804 are attached to the substrate 702, a suspension of phosphor particles in a carrier may be introduced into the cavity 802. The carrier material may be an epoxy or silicone; however, carriers based on other materials may also be used. The carrier material may be cured to produce a solid material in which the phosphor particles are immobilized.

Figure 17:
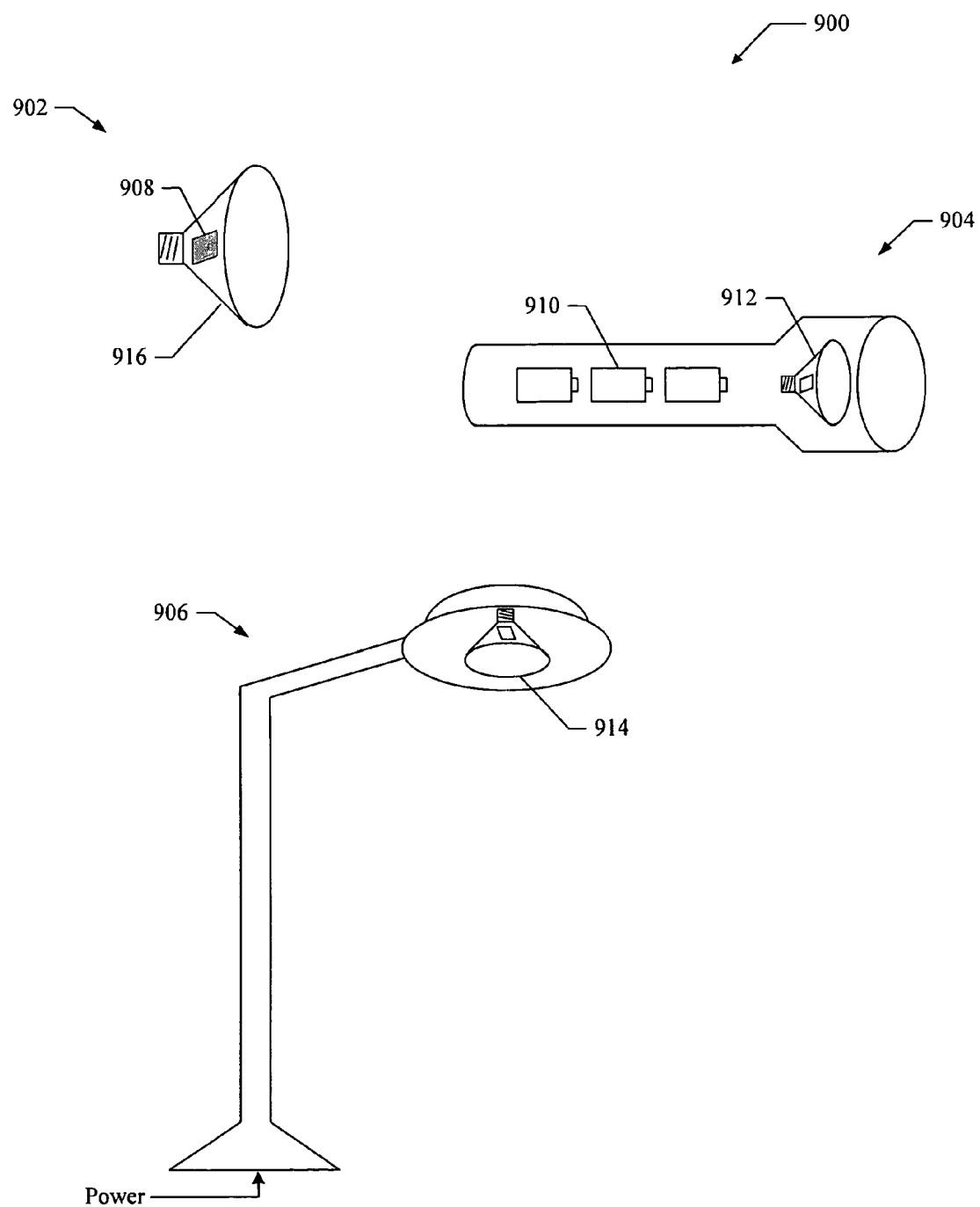
FIG. 17 shows exemplary devices including LEDs or LED devices manufactured by laser scribing in accordance with aspects of the present invention.

FIG. 17 shows exemplary devices including LEDs or LED devices manufactured by laser scribing in accordance with aspects of the present invention. The devices 900 include a lamp 902, an illumination device 904, and a street light 906. Each of the devices shown in FIG. 17 includes at least an LED or an LED device separated via a technique of laser scribing as described herein. For example, lamp 902 includes a package 916 and an LED 908, in which LED 908 is separated using a laser scribing at a location toward the back side of the device. Lamp 902 may be used for any type of general illumination. For example, lamp 902 may be used in an automobile headlamp, street light, overhead light, or in any other general illumination application. Illumination device 904 includes a power source 910 that is electrically coupled to a lamp 912, which may be configured as lamp 902. In an aspect, power source 910 may be batteries or any other suitable type of power source, such as a solar cell. Street light 906 includes a power source connected to a lamp 914, which may be configured as lamp 902. It should be noted that aspects of the LED described herein are suitable for use with virtually any type of LED assembly, which in turn may be used in any type of illumination device and are not limited to the devices shown in FIG. 17.

The various aspects of this disclosure are provided to enable one of ordinary skill in the art to practice the present invention. Various modifications to aspects presented throughout this disclosure will be readily apparent to those skilled in the art, and the concepts disclosed herein may be extended to other LED lamp configurations regardless of the shape or diameter of the glass enclosure and the base and the arrangement of electrical contacts on the lamp. Thus, the claims are not intended to be limited to the various aspects of this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A light-emitting device, comprising:
    first and second power terminals;
    an array of LED based light sources comprising a plurality of sections connected in series, including a first section, a last section, each section comprising an LED, said first section comprising first and second switches, said first switch connecting a first terminal of said LED in that section to a first power rail, said second switch connecting a second terminal of said LED to a second power rail, said last section comprises first and second switches, said first switch connecting one terminal of said LED to said first power rail and said second switch connecting said first terminal of said LED to a second terminal of an LED in an adjacent section; and
    a controller that controls said switches in response to a time-varying potential difference between said first and second power terminals.

2. The light-emitting device of claim 1 further comprising one or more intermediate sections,
    each intermediate section comprising an LED and a plurality of switches, said intermediate sections comprising first, second, and third switches, said first switch connecting a first terminal of said LED in that section to said first power terminal, said second switch connecting a second terminal of said LED to said second power terminal, and said third switch interrupting a serial connection between said LED and an LED in an adjacent section.

3. The light-emitting device of claim 1 wherein each configuration is characterized by a number of LEDs that are connected in series across said first and second power terminals and wherein said controller sets said switches such that said number of LEDs is matched to said potential difference.

4. The light-emitting device of claim 1 wherein said controller sets said switches to maximize total light output from said array as said potential difference varies with time.

* * * * *